US010033852B2

(12) United States Patent
Clavenna, II et al.

(10) Patent No.: US 10,033,852 B2
(45) Date of Patent: Jul. 24, 2018

(54) LIMITING SENSOR USE IN RESTRICTED AREAS

(71) Applicant: Verizon Patent and Licensing Inc., Basking Ridge, NJ (US)

(72) Inventors: Robert A. Clavenna, II, Lucas, TX (US); Paul V. Hubner, McKinney, TX (US); Steven T. Archer, Dallas, TX (US); Kristopher A. Pate, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 508 days.

(21) Appl. No.: 14/104,807

(22) Filed: Dec. 12, 2013

(65) Prior Publication Data

US 2015/0172449 A1 Jun. 18, 2015

(51) Int. Cl.
*H04M 1/725* (2006.01)
*H04W 4/21* (2018.01)
*H04W 4/021* (2018.01)

(52) U.S. Cl.
CPC ... *H04M 1/72577* (2013.01); *H04M 1/72572* (2013.01); *H04W 4/021* (2013.01)

(58) Field of Classification Search
USPC .............................................. 455/456.1–457
See application file for complete search history.

(56) References Cited

U.S. PATENT DOCUMENTS

| | | | | |
|---|---|---|---|---|
| 6,832,093 | B1* | 12/2004 | Ranta | H04W 48/04 455/422.1 |
| 8,763,149 | B1* | 6/2014 | Cohen | H04L 63/10 380/201 |
| 9,474,011 | B2* | 10/2016 | Khalil | H04W 48/02 |
| 2004/0152485 | A1* | 8/2004 | Deeds | H04N 1/00127 455/556.1 |
| 2007/0087764 | A1* | 4/2007 | Buckley | H04M 1/72572 455/466 |
| 2010/0188188 | A1* | 7/2010 | Funada | H04Q 9/00 340/3.1 |
| 2011/0077022 | A1* | 3/2011 | Scovill | H04L 41/12 455/456.1 |
| 2012/0324565 | A1* | 12/2012 | Cohen | G06N 3/02 726/12 |
| 2013/0260721 | A1* | 10/2013 | Carney | H04L 63/10 455/411 |

(Continued)

OTHER PUBLICATIONS

Wikipedia, "Geo-fence", http://en_wikipedia.org/wiki/Geo-fence, Sep. 21, 2013, 2 pages.

*Primary Examiner* — Steven Kelley

(57) ABSTRACT

A device is configured to receive a request to use a sensor of a user device. The device determines a sensitivity area associated with the sensor. The sensitivity area indicates an area the sensor is capable of sensing. The device identifies a restricted area in the sensitivity area. The restricted area corresponds to an area from which the user device is limited from use. The user device identifies a restriction associated with the restricted area, generates a response to the request based on the restriction, and provides the response. The response causes the user device to limit use of the sensor, recording of data captured by the sensor, or access to data recorded by the user device even when the user device is located outside of the restricted area.

20 Claims, 10 Drawing Sheets

(56) References Cited

U.S. PATENT DOCUMENTS

| | | | | |
|---|---|---|---|---|
| 2014/0038577 A1* | 2/2014 | Kushtagi | ............... | H04W 48/04 |
| | | | | 455/418 |
| 2014/0087708 A1* | 3/2014 | Kalita | ..................... | H04W 4/04 |
| | | | | 455/418 |
| 2015/0113631 A1* | 4/2015 | Lerner | ..................... | G06F 21/32 |
| | | | | 726/16 |

* cited by examiner

Fig. 5

| User data 510 | Restricted Area ID 520 | Restricted Area Boundary 530 | Sensor Restriction 540 | Playback Restriction 550 |
|---|---|---|---|---|
| Principal | School Grounds | Area 1 | Video recording prohibited from 8am-4pm | No restriction |
| Principal | School Bathroom | Area 2 | All recording prohibited | All playback prohibited |
| Mr. Smith | Tracker 123 | Sphere with a radius of 10 meters centered on tracker location | Image and video recording permitted only for group A | Audio playback prohibited after 24 hours |
| User 0129 | Location 0129 | Area 3 | Record video with censor block | Image playback prohibited within 24 hours |
| Rock Band | ABC Theater | Area 4 | No restriction | Require license for playback |

500

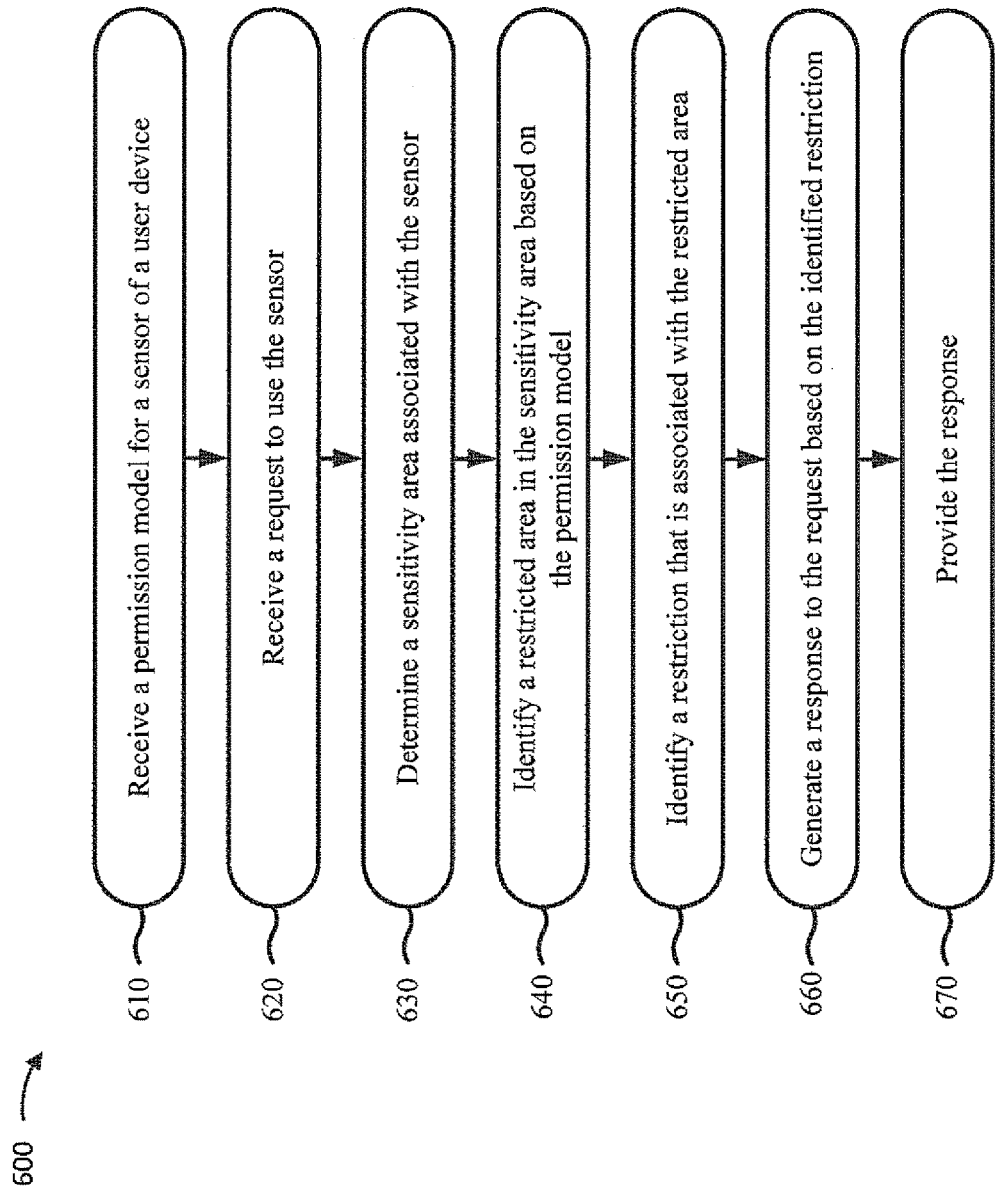

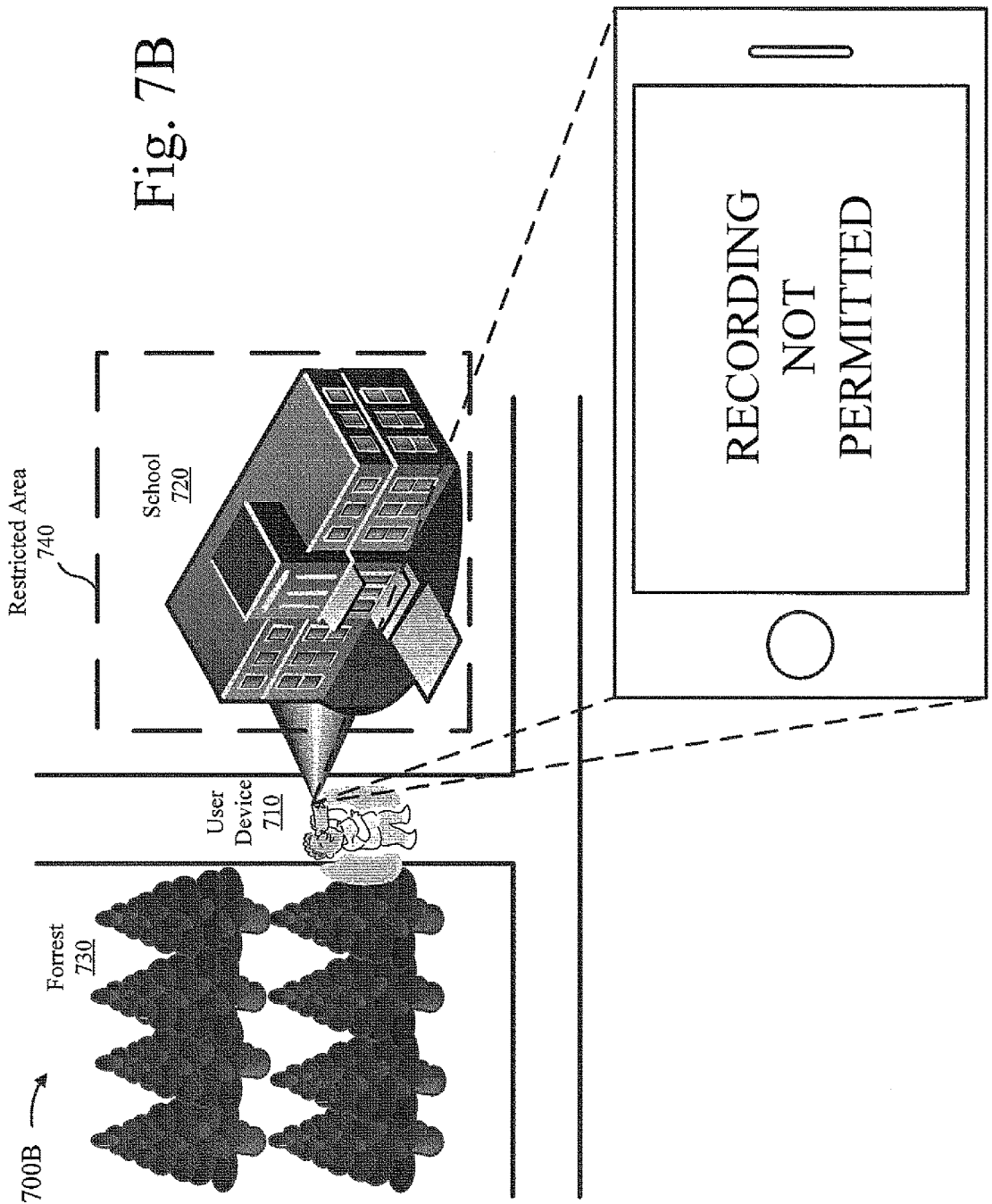

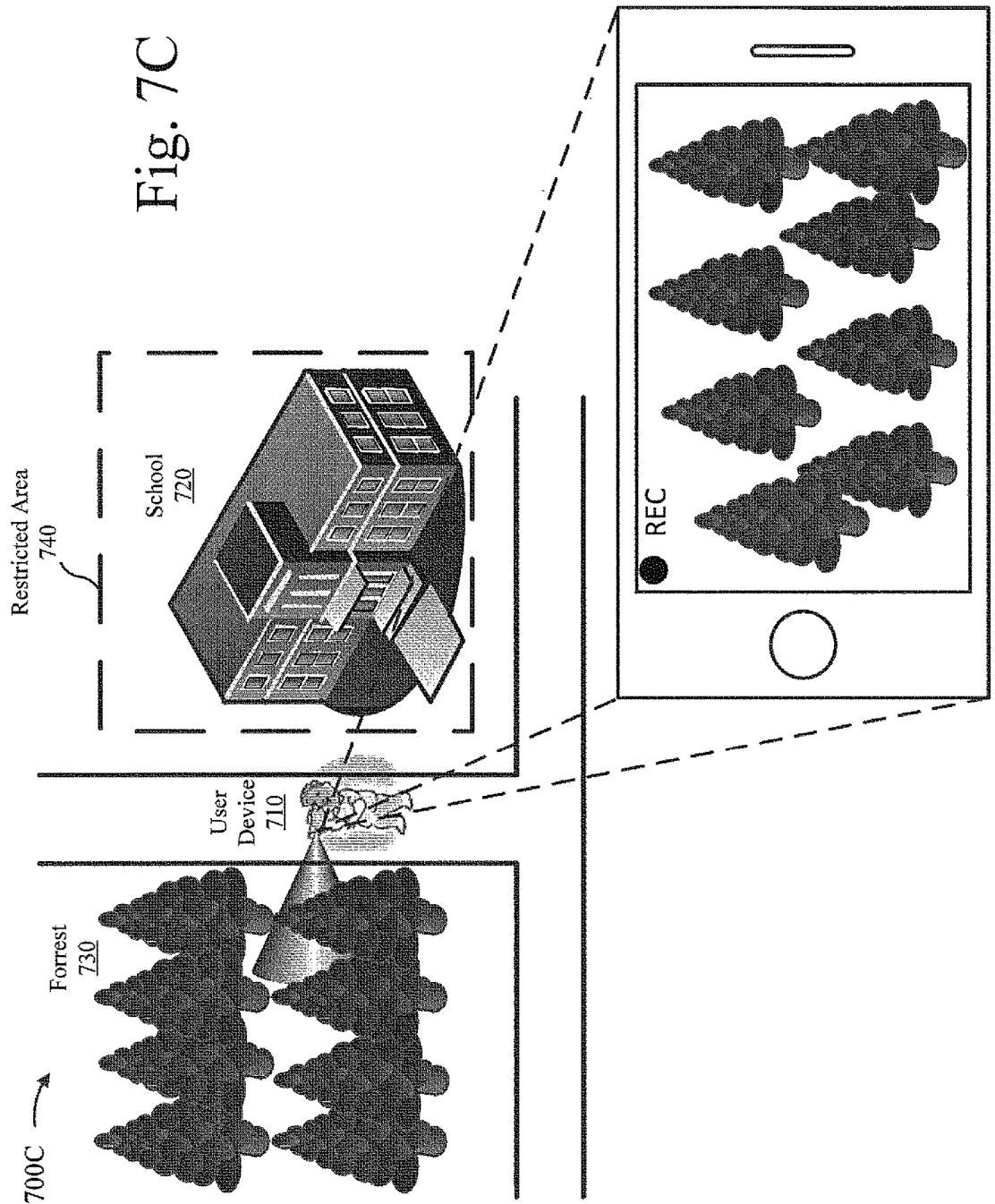

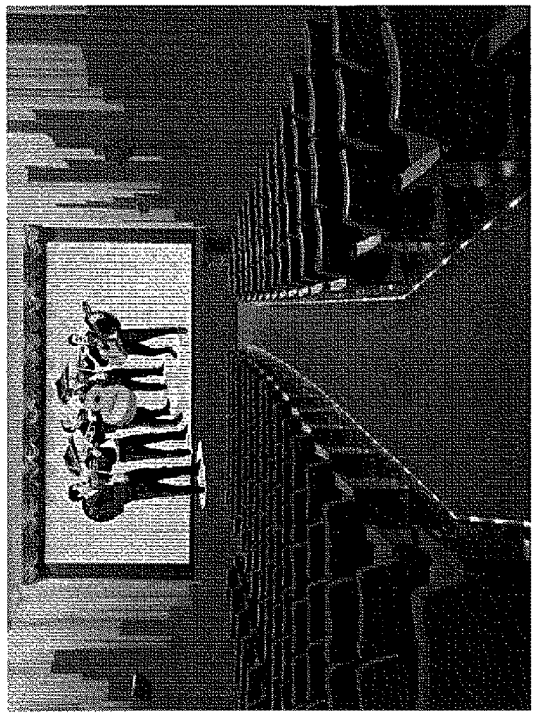
Fig. 8A
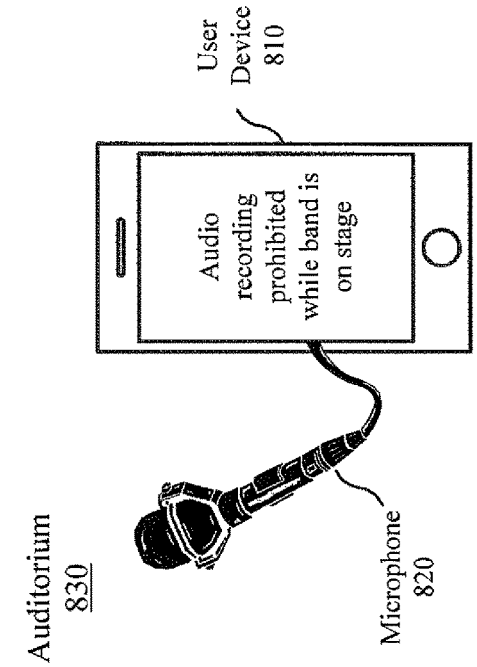
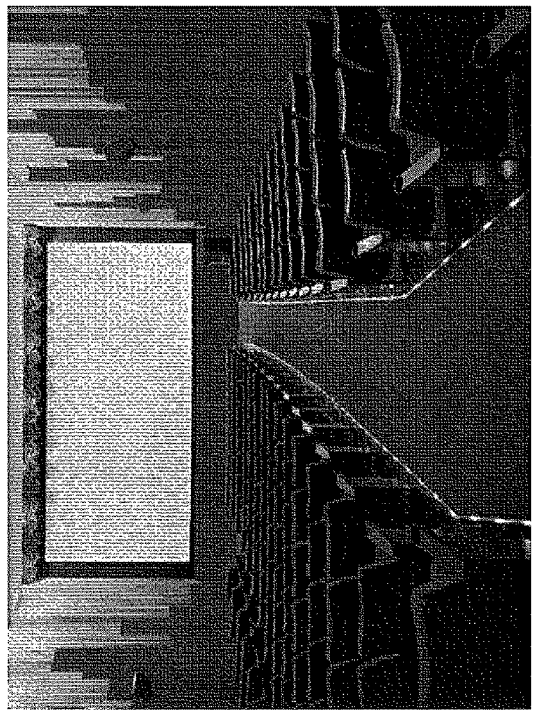
Fig. 8B
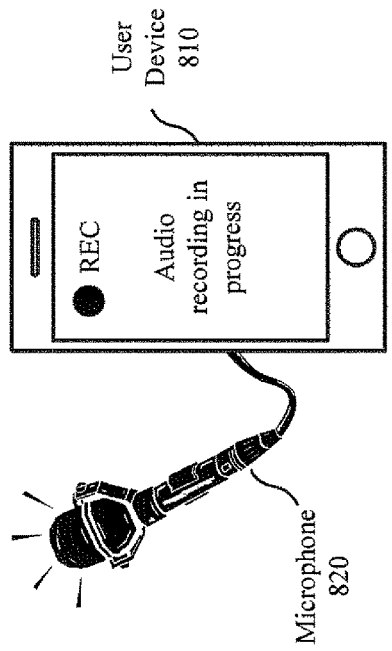

LIMITING SENSOR USE IN RESTRICTED AREAS

BACKGROUND

A user device, such as a smart phone, includes various sensors and is often used to sense and record information. The user device can sense and record information regardless of where the user device is located or where the object being recorded is located.

BRIEF DESCRIPTION OF THE DRAWINGS

FIG. 5 is a diagram of an example data structure that may be stored in the blocked location storage device;

FIG. 6 a flow chart of an example process for providing a response to a request to use a sensor of a user device;

FIGS. 7A-7C are diagrams of an example implementation relating to the example process shown in FIG. 6; and FIGS. 8A and 8B are diagrams of another example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

A user device, such as a smart phone, may record images, videos, sounds, or other information at any area or of any area. However, people may not desire for information to be recorded at certain areas or of certain areas. Implementations described herein may protect privacy of restricted areas by placing restrictions on what a user device can record or sense within a usable range of the sensor.

Figure 1:
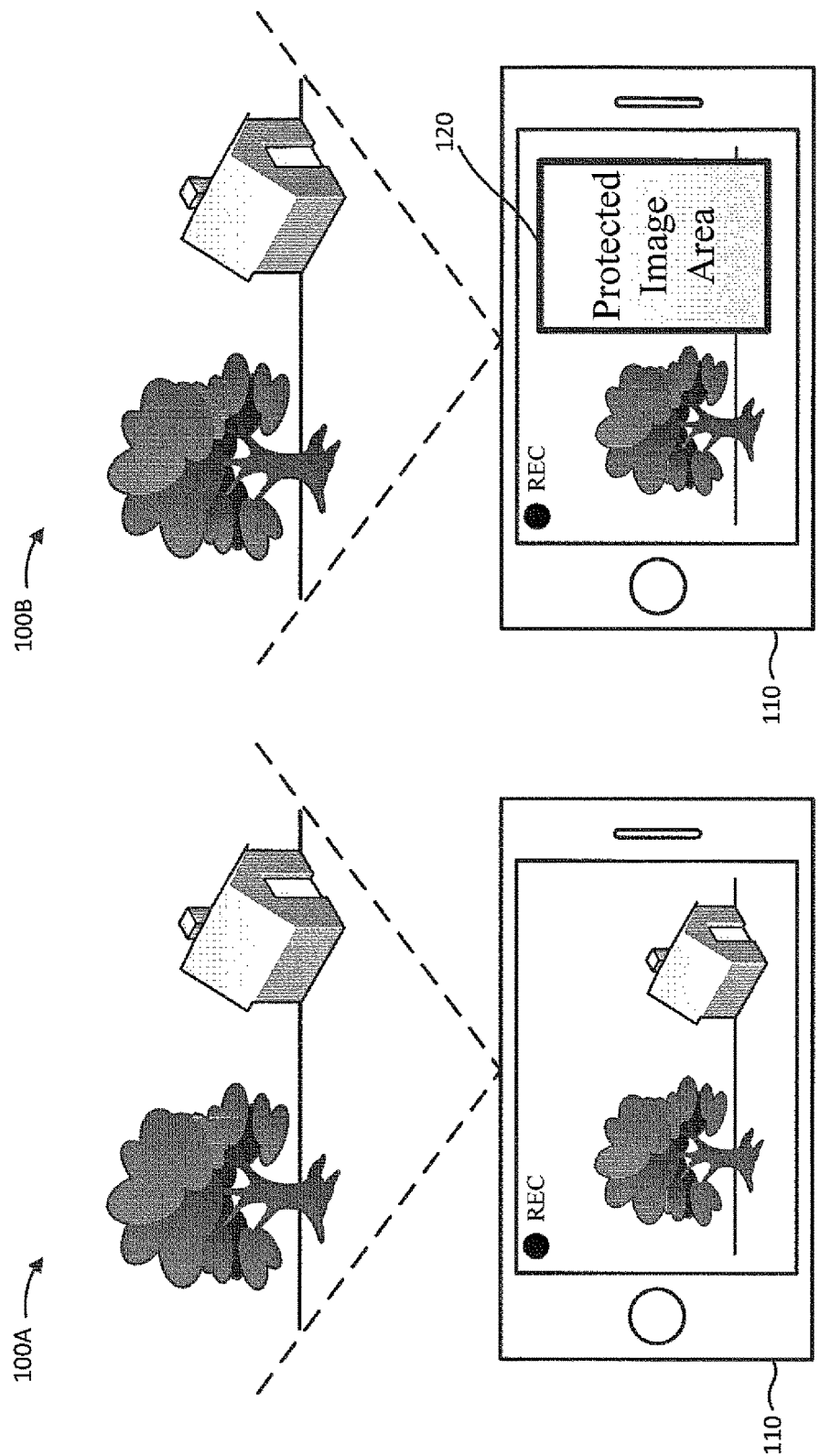
FIGS. 1A and 1B are diagrams of an overview of an example implementation described herein.

FIGS. 1A and 1B are diagrams illustrating an overview of example implementations described herein. FIG. 1A illustrates an example implementation 100A where a user device 110 may be used to record an image of a physical location. Assume the physical location includes a tree and a house. Accordingly, when user device 110 records an image of the physical location, the image includes an image of the tree and an image of the house. Thus, regardless of whether the image intrudes on the privacy of the people living in the house, user device 110 may record the image of the house.

Referring to example implementation 100B illustrated in FIG. 1B, assume the house is designated as a restricted area, such that images of the house are prohibited from being recorded. Restricted area data is recorded and may indicate a location and/or boundary of the house. Furthermore, restriction data is recorded and may indicate what kind of recording is permitted at the house, who is permitted to record the house, and/or other conditions or restrictions for recording the house.

An application on user device 110 may request permission to use the camera on user device 110 at the current location. Location data associated with user device 110 can be determined and may indicate a position and/or orientation of user device 110. For example, in FIG. 1B, the location data may indicate that user device 110 is located at the physical location of the house and/or facing the house. Furthermore, assume that sensor capabilities are known for the camera of user device 110. For example, assume a kind of camera in user device 110 is known to capture images of objects no more than 500 meters away.

Based on the location data and the sensor capability data, a sensitivity area in which user device 110 is capable of recording images may be determined. A restricted area in the sensitivity area may be identified. Likewise, restriction data associated with the restricted area may be identified.

In FIG. 1B, assume the house is determined to be in the sensitivity area of user device 110. Also, assume the house is associated with a restriction that only permits the camera to record an image of the house in a censored manner. For example, as shown in FIG. 1B, user device 110 may be permitted to use the camera to record an image with a block 120 displayed where the image of the house should have been. Other examples (not shown in FIG. 1B) of recording an image of the house in a censored manner may include prohibiting the camera from recording an image, prohibiting the display of the recorded image, blurring a display of the house in the recorded image, pixilating a display of the house in the recorded image, etc.

In this way, user device 110 is prevented from recording an image of a restricted area (e.g., the house) and the privacy of people associated with the restricted area can be protected.

Figure 2:
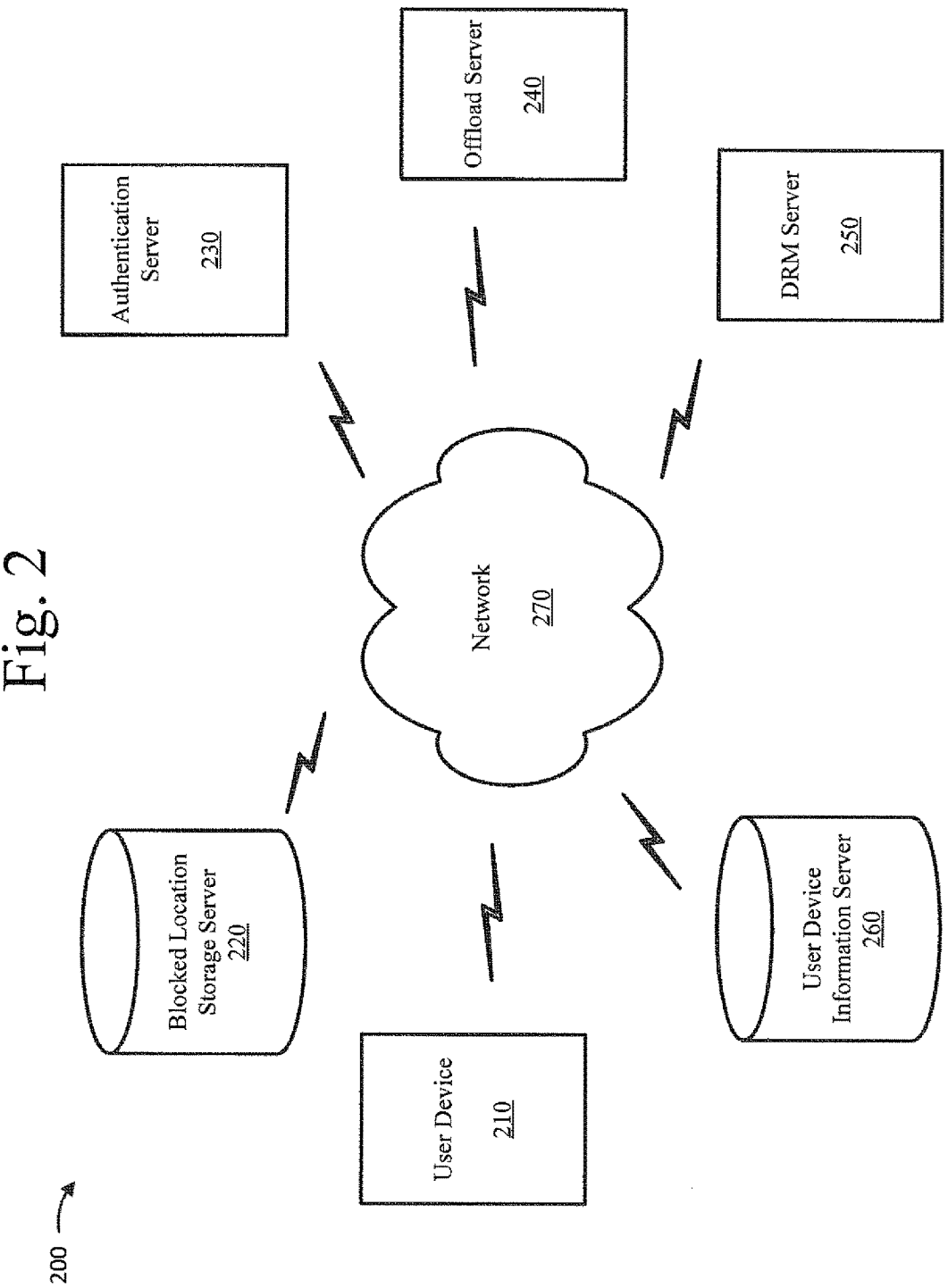
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a blocked location storage server 220, an authentication server 230, an offload server 240, a digital rights management ("DRM") device 250, a user device information server 260, and/or a network 270.

User device 210 may include a device capable of recording, sensing, inputting, and/or outputting information. For example, user device 210 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), or a similar device. In some implementations, user device 210 may include a communication interface that allows user device 210 to receive information from and/or transmit information to blocked location storage server 220 and/or another device in environment 200. In some implementations, user device 210 may include sensors, such as a camera, a microphone, an accelerometer, a gyroscope, a global positioning system ("GPS") device, a magnetometer, a gravity sensor, a rotational sensor, a temperature/thermal sensor, a proximity sensor, a light sensor, a pressure sensor, a humidity sensor, an infrared sensor, a radio wave sensor, a dual lens camera, and/or another component that permits user device 210 to receive input and/or detect conditions in a vicinity of user device 210.

Blocked location storage server 220 may include one or more devices capable of processing and/or routing information, and may include one or more storage devices capable of storing and/or searching a data structure (e.g., a database). In some implementations, blocked location storage server 220 may include a communication interface that allows blocked location storage server 220 to receive information from and/or transmit information to other devices in environment 200.

Authentication server 230 may include one or more devices capable of processing and/or routing information. Additionally, or alternatively, authentication server 230 may include one or more devices capable of storing authentication information. The authentication information may indicate users that are authorized to manage restrictions and/or users that are authorized to use sensors. In some implementations, authentication server 230 may include a communication interface that allows authentication server 230 to receive information from and/or transmit information to other devices in environment 200.

Offload server 240 may include one or more devices capable of processing and/or routing information. In some implementations, offload server 240 may include a communication interface that allows offload server 240 to receive information from and/or transmit information to other devices in environment 200. For example, offload server 240 may generate permission models based on information stored by blocked location storage server 220 and transmit the permission models to user device 210.

DRM server 250 may include one or more devices capable of storing and/or processing digital rights information. In some implementations, DRM server 250 may include a communication interface that allows DRM server 250 to receive information from and/or transmit information to other devices in environment 200.

User device information server 260 may include one or more devices capable of storing user information, such as user account information and/or user device information. In some implementations, user device information server 260 may include a communication interface that allows user device information server 260 to receive information from and/or transmit information to other devices in environment 200.

Network 270 may include one or more wired and/or wireless networks. For example, network 270 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 270 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
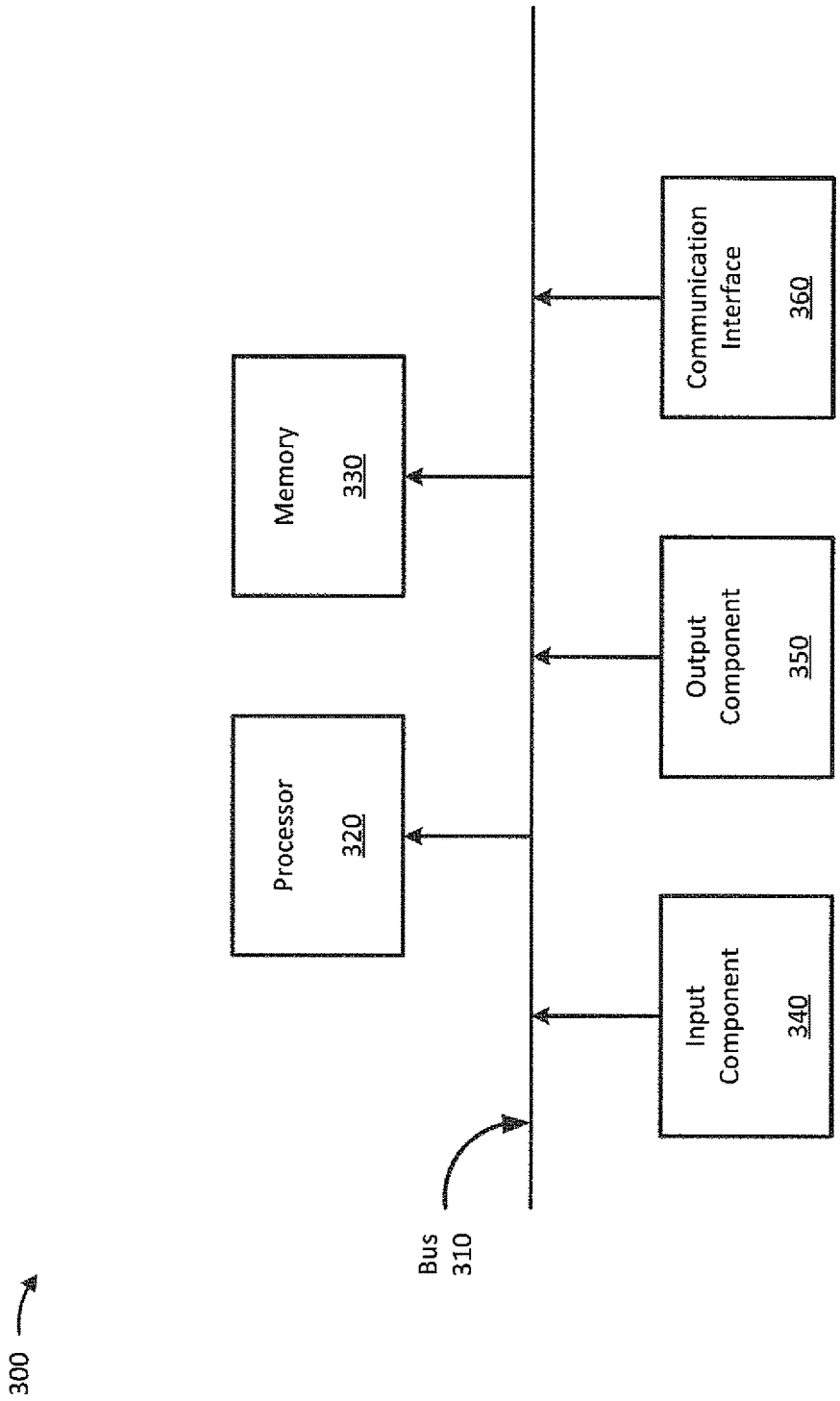
FIG. 3 is a diagram of example components of one or more devices of FIG. 2.

FIG. 3 is a diagram of example components of a device 300. Device 300 may correspond to user device 210, blocked location storage server 220, authentication server 230, offload server 240, DRM server 250, and/or user device information server 260. As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). If device 300 corresponds to user device 210, input component 340 may also include a sensor for sensing information. For example, input component 340 may include a sensor, such as a camera, a microphone, an accelerometer, a gyroscope, a GPS device, a magnetometer, a gravity sensor, a rotational sensor, a temperature/thermal sensor, a proximity sensor, a light sensor, a pressure sensor, a humidity sensor, an infrared sensor, a radio wave sensor, a dual lens camera, and/or another component that permits user device 210 to receive input and/or detect conditions in the vicinity of user device 210.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of user device 210, blocked location storage server 220, authentication server 230, offload server 240, DRM server 250, and/or user device information server 260 may include one or more devices 300 and/or one or more components of device 300.

Figure 4:
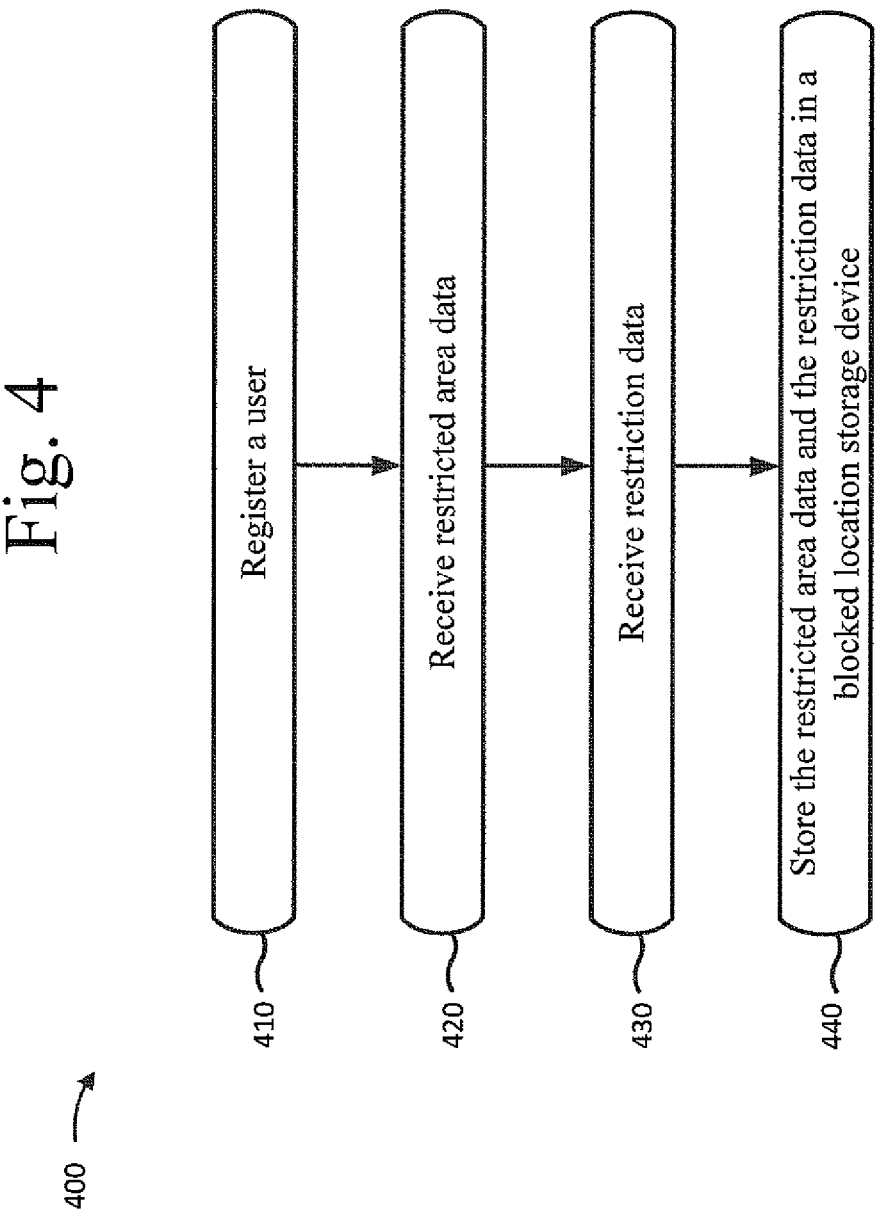
FIG. 4 is a flowchart of an example process for storing information in a blocked location storage device.

FIG. 4 is a flow chart of an example process 400 for storing information in blocked location storage server 220. In some implementations, one or more process blocks of FIG. 4 may be performed by blocked location storage server 220. Additionally, or alternatively, one or more process blocks of FIG. 4 may be performed by another device or group of devices separate from or including blocked location storage server 220, such as user device 210, authentication server 230, offload server 240, DRM server 250, and/or user device information server 260.

As shown in FIG. 4, process 400 may include registering a user (block 410). For example, blocked location storage server 220 may receive an input (e.g., from a user of user device 210 and/or from another device in environment 200) indicating user information of the user. The user information may include a user name, a user ID, contact information, status information (e.g., a police officer, a school principal, etc.), an age, authorization information, a password, and/or billing information. Blocked location storage server 220 may register the user based on the user information.

Additionally, or alternatively, blocked location storage server 220 may authenticate the user using authentication server 230. For example, authentication server 230 may store authentication information indicating which users are authorized to manage and set restrictions for certain areas and/or sensors. For example, the authentication information may indicate a person authorized to add, change, or delete restrictions. Blocked location storage server 220 may transmit the user information to authentication server 230, and authentication server 230 may determine for which areas and/or sensors the user is authorized to set restrictions based on the user information. Authentication server 230 may transmit the authentication information indicating for which areas and/or sensors the user is authorized to set restrictions to blocked location storage server 220.

Blocked location storage server 220 may use the received user information and authorization information to register the user and create an account for the user. Once the user is registered, the user may be allowed to input restricted area data and restriction data to blocked location storage server 220 for authorized areas and/or sensors.

As further shown in FIG. 4, process 400 may include receiving the restricted area data (block 420). For example, blocked location storage server 220 may receive an input of the restricted area data (e.g., from a user of user device 210 and/or from another device). Blocked location storage server 220 may provide a user interface via which a user can input the restricted area data. The user may input the restricted area data in multiple ways. For example, the user may draw boundaries of an area on a map, input GPS coordinates, input an address, select an area from a list, walk around a border of an area with a GPS device, and/or identify a tracking device (e.g., user device 210).

The restricted area data may include data identifying a restricted area. The restricted area may be any physical location. For example, the restricted area may be a location of a building (e.g., a house, a school, an auditorium, a government building, etc.), a room (e.g., a bathroom, a bedroom, a class room, etc.), an outdoor location (e.g., a playground, a parking lot, a park, a front yard, etc.), and/or any other physical location. The restricted area data may be as detailed as necessary to identify the restricted area. For example, the restricted area data may distinguish between a store on a first floor of a building and an apartment on a second floor of the building. The restricted area may also be a combination of locations (e.g., a playground and a school).

Additionally, or alternatively, the restricted area may be moveable and does not need to be a fixed location. In some implementations, the restricted area may be an area based on a location of a tracking device. For example, the restricted area may be a certain area surrounding a tracking device (e.g., a sphere around user device 210 with a radius of 10 meters). The tracking device may be user device 210. In other words, a current location of the tracking device and a predetermined area around or near user device 210 can be set as the restricted area. Accordingly, the tracking device transmits the tracking device's location as the tracking device moves and updates the location of the restricted area in blocked location storage server 220. Accordingly, a location of user device 210 (e.g., the tracking device) may correspond to a restricted area, so that the user is protected wherever the user goes. In some implementations, the tracking device used to identify the restricted area may be stationary. For example, the tracking device may be attached to a tree, a flag pole, a chair, a window, a wall, etc.

Once a user inputs the restricted area data, the restricted area data can be provided to and received by blocked location storage server 220.

As further shown in FIG. 4, process 400 may include receiving restriction data (block 430). For example, blocked location storage server 220 may receive an input of the restriction data (e.g., from the user of user device 210 and/or from another device in environment 200). Blocked location storage server 220 may provide a user interface via which a user can input the restriction data. The user may input the restriction data in multiple ways. For example, the user may create a restriction, select a restriction from a list, use a template, etc. Moreover, a restriction can be shared for use by other users.

The restriction data may include data identifying a restriction to be implemented by user device 210. The restriction may be any limitation on user device 210. For example, the restriction may limit an input component 340 and/or an output component 350 in user device 210. In some implementations, the restriction may be to disable and/or limit a sensor (e.g., disable a camera and/or disable a microphone). Accordingly, user device 210 may be restricted from using the sensor to collect data and/or limit the data that can be collected. Additionally, or alternatively, the restriction may prohibit recording of the sensor (e.g., prohibit recording of a video, an image, or a sound, etc.). Accordingly, the sensor may still be used, but any data gathered by the sensor may not be recorded. The restriction may also limit and/or censor recording of the sensor (e.g., only record images in black and white, record video with a censor block, degrade quality of recording, etc.). In some implementations, the restriction may disable, limit, and/or censor an output component (e.g., disable a LED, limit volume of a speaker, etc.). In this way, user device 210 may be prohibited from interrupting something at the restricted area. The restriction may also limit access to the recorded content (e.g., apply a DRM protection to the recorded content, delete the recorded content, play the recorded content with a censor block, require a license to play the recorded content, limit time to view the recorded content, etc.). The restriction may include multiple restrictions and may apply to any combination of sensors, input components 340, output components 350, access to recorded content, etc.

The restriction data may also include a condition for the restriction to apply. In some implementations, the condition is a non-location based condition. For example, the restriction may only apply at a certain time (e.g., the restriction enforced from 8 am-4 pm) and/or based on sensor data (e.g., the restriction applies when acceleration satisfies a threshold level, when ambient noise satisfies a threshold level, etc.). The condition may include multiple conditions and may apply to any combination of restrictions.

In some implementations, the restriction may apply to specified people and/or the restriction may exempt certain people. For example, only students may be able to use a camera to record backstage at a school play. However, the user who created the restriction (e.g., the principal) may modify the restriction and allow a reporter to use a camera to record backstage. Accordingly, only the students and the reporter may be able to use a camera to record backstage and everyone else may be restricted from using a camera to record backstage.

In some implementations, the restriction may not be associated with a restricted area. In other words, the restriction may be a geographic-free restriction. For example, a geographic-free restriction may include a prohibition on recording using a microphone when a sensed audio level is greater than the sensitivity of the microphone.

In some implementations, the restriction may indicate a threshold level of sensor data needed to acquire permission to use a sensor. For example, the restriction may require information indicating a GPS location and a camera direction be used to determine if the camera is used in a restricted area. If the GPS location and the camera direction indicate the camera is not being used in a restricted area, then user device 210 may be permitted to use the camera. On the other hand, if the GPS location and the camera direction indicate the camera is being used in a restricted area, or the GPS location and/or the camera direction is unknown, then user device 210 may not be permitted to use the camera. For example, if user device 210 does not include a GPS device, the GPS location may not be known and user device 210 may not be allowed to use the camera.

Once the restriction data is input, the restriction data can be provided to and received by blocked location storage server 220.

As further shown in FIG. 4, process 400 may include storing the restricted area data and the restriction data in blocked location storage server 220 (block 440). For example, blocked location storage server 220 may associate the user information, the restricted area data, and/or the restriction data and store the information in a correlated manner. Additionally, or alternatively, blocked location storage server 220 may store the user information, the restricted area data, and/or the restriction data in a manner that allows the information to be searched.

While a series of blocks has been described with regard to FIG. 4, the blocks and/or the order of the blocks may be modified in some implementations. Additionally, or alternatively, non-dependent blocks may be performed in parallel.

FIG. 5 is a diagram of an example data structure 500 that may be stored in blocked location storage server 220.

Data structure 500 may include one or more entries. Each entry may include the user information, the restricted area data, the restriction data, and/or other data stored in a correlated manner. For example, an entry may include user data field 510, restricted area ID field 520, restricted area boundary field 530, a sensor restriction field 540, and/or a playback restriction field 550. An entry may include fewer fields than shown in data structure 500, additional fields than shown in data structure 500, and/or different fields than shown in data structure 500.

User data field 510 may identify or represent the user who created or is permitted to modify the entry in blocked location storage server 220. User data field 510 may include a user name, a user ID, contact information, status information, an age, authorization information, a password, billing information, etc. For example, as shown in FIG. 5, user data field 510 may include a status (e.g., principal), a user ID (e.g., User 0129), and/or a name (e.g., Mr. Smith and/or Rock Band).

Restricted area ID field 520 may identify or represent the restricted area. Restricted area ID field 520 may identify a location name, a location ID, a tracker device name, a tracker device ID, etc. For example, as shown in FIG. 5, restricted area ID field 520 may include a location name (e.g., school grounds, ABC Theater, and/or school bathroom), a location ID (e.g., location 0129), and/or a tracker device ID (e.g., Tracker 123).

Restricted area boundary field 530 may identify or represent a physical boundary of the restricted area. For example, restricted area boundary field 530 may include location coordinates representing a physical location (e.g., latitude and longitude coordinates, GPS coordinates, etc.). For example, as shown in FIG. 5, Area 1 may be defined by GPS coordinates and Area 2 may be defined by latitude and longitude coordinates. Restricted area boundary field 530 may also, or alternatively, be a shape surrounding a physical location (e.g., a circle, an oval, a sphere, a square, a rectangle, a box, etc.). For example, as shown in FIG. 5, restricted area boundary field 530 may be a sphere with a radius of 10 meters centered on a tracker device location (e.g., Tracker 123).

Sensor restriction field 540 may identify or represent a restriction on user device 210. The restriction may be any restriction on user device 210. In some implementations, the restriction may be to disable a sensor (e.g., disable a camera, a microphone, an accelerometer, a gyroscope, etc.), to prohibit recording of the sensor (e.g., prohibit recording of a video, an image, or a sound, etc.), to censor and/or limit recording of the sensor (e.g., only record images in black and white, record video with a censor block, degrade quality of recording, etc.), and/or to disable, limit, and/or censor an output component 350 (e.g., disable a LED, limit volume of a speaker, etc.). Sensor restriction field 540 may include multiple restrictions and may apply to any combination of sensors, input components 340, output components 350, access to recorded content, etc.

Sensor restriction field 540 may also include a condition for the restriction to apply. For example, the restriction may only apply at a certain time, apply to a certain group, and/or be based on sensor input information. The condition may include multiple conditions and may apply to any combination of restrictions.

For example, as shown in FIG. 5, sensor restriction field 540 may include "video recording prohibited from 8 am-4 pm," "all recording prohibited," "image and video recording permitted only for group A," "record video with censor block," and/or "no restriction." Additionally, or alternatively, sensor restriction field 540 may include any combination of a restriction and/or a condition.

Playback restriction field 550 may identify or represent a restriction on a playback of recorded content. For example, playback restriction field 550 may limit or prohibit the playback of the recorded content, apply a DRM protection to the recorded content, delete the recorded content, play the recorded content with a censor block, require a license to play the recorded content, and/or limit a time to access (e.g., listen, view, etc.) the recorded content. Playback restriction field 550 may include multiple restrictions and may apply to any combination of sensors, input components 340, output components 350, the playback of recorded content, etc.

Playback restriction field 550 may also include a condition for the restriction to apply at the restricted area. For example, the restriction may only apply at a certain time, apply to a certain group, and/or be based on sensor input information. The condition may include multiple conditions and may apply to any combination of restrictions.

For example, as shown in FIG. 5, playback restriction field 550 may include "no restriction," "all playback prohibited," "audio playback prohibited after 24 hours," "image playback prohibited within 24 hours," and/or "require a license for playback." Additionally, or alternatively, playback restriction field 550 may include any combination of a restriction and/or a condition on the playback of recorded content.

Accordingly, data structure 500 may store an entry associating data of user data field 510, restricted area ID field 520, restricted area boundary field 530, sensor restriction field 540, and playback restriction field 550. For example, assume a scenario where a principal of a school registers with blocked location storage server 220. The principal identifies the school grounds as a restricted area and identifies an Area 1 representing a boundary of the school grounds. The principal also inputs a restriction for the school grounds that video recording is prohibited from 8 am-4 pm, but does not put any restriction on playing back recordings of the school grounds. As shown in FIG. 5, an entry in data structure 500 for this scenario may include "principal" in user data field 510, "school grounds" in restricted area ID field 520, "Area 1" in restricted area boundary field 530, "video recording prohibited from 8 am-4 pm" in sensor restriction field 540, and "no restriction" in playback restriction field 550.

FIG. 6 is a flow chart of an example process 600 for providing a response to a request to use a sensor of a user device. In some implementations, one or more process blocks of FIG. 6 may be performed by user device 210. Additionally, or alternatively, one or more process blocks of FIG. 6 may be performed by another device or group of devices separate from or including user device 210, such as blocked location storage server 220, authentication server 230, offload server 240, DRM server 250, and/or user device information server 260.

As shown in FIG. 6, process 600 may include receiving a permission model for a sensor of user device 210 (block 610). For example, user device 210 may receive the permission model from offload server 240.

In some implementations, user device 210 and/or another device may automatically transmit location information of user device 210 and information identifying user device 210 to offload server 240. User device 210 and/or the other device may determine the location information of user device 210 based on a GPS device, a cell tower connected to user device 210, triangulation, a wireless access point connected to user device 210, and/or a similar technique. Additionally, or alternatively, user device 210 may transmit a request, including the location information, to offload server 240 for offload server 240 to provide a permission model and/or a request to use a sensor. Offload server 240 may receive the request and calculate the permission model and/or provide a response to the request to use the sensor. Offload server 240 may then transmit a permission model corresponding to the location information to user device 210.

The permission model may be used by user device 210 to determine if a sensor is restricted from use.

For example, the permission model may include information on restricted areas in a predetermined area around the location of user device 210. For example, offload server 240 may identify a restricted area in blocked location storage server 220 based on the predetermined area around the location of user device 210. For instance, offload server 240 may search blocked location storage server 220 to determine if the predetermined area includes a restricted area defined by restricted area boundary field 530 in data structure 500. The restriction area information may indicate the boundary of the restricted area.

The permission model may include information on restrictions. For example, offload server 240 may identify restrictions associated with the restricted areas identified using data structure 500. For instance, assume a restriction "video recording prohibited from 8 am-4 pm" is associated with the school grounds as shown in FIG. 5. Thus, offload server 240 may include "video recording prohibited from 8 am-4 pm" as a restriction associated with a restricted area in the permission model.

As previously discussed, the restriction may apply to certain people and/or certain people may be exempt from the restriction. Accordingly, the permission model may indicate whether the restriction applies to the user of user device 210 based on the information identifying user device 210 received by offload server 240. Offload server 240 may send the information identifying user device 210 to authorization server 230 to determine if the user is exempt from the restriction associated with the restricted area. For example, the restriction may limit using a camera to record backstage at a play to only students. However, the user who created the restriction (e.g., the principal) may modify the restriction and allow a reporter to use a camera to record backstage too. Accordingly, if authorization server 230 determines that the user is one of the students or the reporter, the permission model may indicate that the restriction does not apply to the user. On the other hand, if the authorization server 230 determines that the user is not one of the students or the reporter, the permission model may indicate that the restriction does apply to the user.

In some implementations, the permission model may include DRM information obtained from DRM server 250. For example, data structure 500 may indicate that DRM information is associated with the restricted area and stored in DRM server 250. Offload server 240 may obtain the DRM information from DRM server 250 based on the information contained in data structure 500. The DRM information may include a DRM protection to be applied to recorded content. In some implementations, the DRM protection may include instructions to encrypt the recorded content, prevent copying of the recorded content, prevent altering of the recorded content, upload the recorded content to DRM server 250 or another device, etc. For example, the DRM information, obtained from DRM server 250 and included in the permission model, may include an encryption algorithm to be used by user device 210 to encrypt the recorded content.

The permission model may include a data structure generated based on the data structure stored in blocked location storage server 220. For example, the data structure may be of the same format as data structure 500 shown in FIG. 5, and include entries related to the predetermined area around the location of user device 210. The data structure may have a format that may be searched by user device 210.

The permission model may further include information on a sensitivity area of a sensor. The sensitivity area may represent a useable area of the sensor. For example, the sensitivity area may be a physical area that the sensor in user device 210 is capable of sensing. The sensitivity area may be based on a location of user device 210 and a sensor parameter of the specific sensor included in user device 210. The sensor parameter may indicate a capability of the sensor. In some implementations, the sensor parameter may include a range at which the sensor is capable of detecting information. Thus, based on the range of the sensor and the location of user device 210, a sensitivity area may be calculated. For example, assume the sensor is a camera capable of acquiring an image of an object no more than 500 meters away. Further, assume user device 210 has GPS coordinates corresponding to location A. The sensitivity range may be calculated to be a sphere with a radius of 500 meters centered at location A.

Offload server 240 and/or another device in environment 200 that calculates the sensitivity area may acquire the sensor parameter from user device 210, user device information server 260, and/or another device in environment 200. For example, user device 210 may store the sensor parameter (e.g., in a tagging capabilities file and/or in an XML header) and transmit the sensor parameter to offload server 240. Alternatively, user device information server 260 may store information associated with user device 210, including the sensor parameter. For example, user device information server 260 may store information relating to a user's account, such as a make and a model of user device 210 used by the user. Based on the make and model of the user device 210, a specific sensor parameter can be found.

In some implementations, the permission model may include other location information indicating one or more restricted areas outside the sensitivity area (e.g., a nearby restricted area) and one or more restrictions associated with the other restricted area(s). For example, offload server 240 may identify, in data structure 500, a restricted area outside the sensitivity area. Offload server 240 may identify a restriction associated with the restricted area outside the sensitivity area. Thus, the permission model may include other location information about the restricted area outside the sensitivity area. Accordingly, if user device 210 is moved to the restricted area outside the sensitivity area, user device 210 may not be required to obtain a new permission model. This idea may be expanded to generate a local permission map of the area surrounding user device 210, which can be included in the permission model.

In some implementations, the permission model may include a response to a request to use the sensor. The response may be based on the sensitivity area, restricted area, and/or the restriction determined by offload server 240. For example, the response may be a token, a cryptographic token, a permission token, a flag, etc. The response may include permission information indicating whether the sensor is permitted to use the sensor. For example, the permission information may be a zero (0) or a one (1) indicating whether the sensor is permitted to use the sensor based on a restriction. In other words, offload server 240 may determine whether the sensor is permitted to be used. Additionally, or alternatively, the response may include expiration information indicating an expiration of the response. For example, the expiration information may indicate the response can only be used a certain number of times and/or expires after a certain amount of time.

User device 210 may receive new or updated permission models in real time from offload server 240. Additionally, or alternatively, user device 210 may receive new or updated permission models when user device 210 changes locations. For example, user device 210 may receive a new permission model when user device 210 moves to a new location outside the predetermined area around the previous location of user device 210 for which the previous permission model included restriction area information and restriction information. In some implementations, user device 210 may request offload server 240 send a permission model and user device 210 may receive the permission model based on the request. Additionally, or alternatively, offload server 240 may predict which permission models should be sent to user device 210 and when the permission models should be sent to user device 210. For example, offload server 240 may make such a prediction based on a history of locations of user device. For example, if user device 210 is at certain location (e.g., an office) from 9:00 AM to 5:00 PM every weekday, offload server 240 may update permission models for the certain location every weekday from 9:00 AM to 5:00 PM and send the updated permission models to user device 210.

As shown in FIG. 6, process 600 may further include receiving a request to use a sensor of user device 210 (block 620). For example, user device 210 may receive the request from an operating system on user device 210, an application executed on user device 210, and/or the sensor of user device 210.

In some implementations, user device 210 may include a requirement at an operating system level and/or a device driver level to send the request whenever an application installed on user device 210 requests to use the sensor. Additionally, or alternatively, user device 210 may receive the request while the sensor is in use to ensure continued use of the sensor is permitted. In some implementations, user device 210 may receive the request in a continuous or periodic manner before the application requests to use the sensor. Accordingly, user device 210 may provide a response to the request to use the sensor before the application actually requests to use the sensor. Receiving the request and providing the response in such a manner may shorten the time required to authorize use of the sensor and/or the time to acquire any restrictions associated with the use of the sensor.

In some implementations, the request to use the sensor may be received after the permission model is received. For example, user device 210 may receive and store the permission model until the permission model is needed to process the request. Accordingly, user device 210 may use the stored or cached permission model to process the request and generate a response. Additionally, or alternatively, user device 210 may receive the request to use the sensor and send a request to offload server 240 to provide a permission model based on the request and/or to provide a response to the request.

As shown in FIG. 6, process 600 may further include determining a sensitivity area associated with the sensor (block 630). For example, user device 210 may determine the sensitivity area associated with the sensor by calculating the sensitivity area, or by receiving information identifying the sensitivity area included in the permission model from offload server 240. Additionally, or alternatively, user device 210 may calculate the sensitivity area based on information identifying the sensitivity area included in the permission model.

The sensitivity area may represent a useable area of the sensor. For example, the sensitivity area may be a physical area that the sensor in user device 210 is capable of sensing. The sensitivity area may be based on a location of user device 210 and a sensor parameter of the specific sensor included in user device 210. The sensor parameter may indicate a capability of the sensor. In some implementations, the sensor parameter may include a range at which the sensor is capable of detecting information. Thus, based on the range of the sensor and the location of user device 210, a sensitivity area may be calculated.

In some implementations, user device 210 may determine the sensitivity area by calculating the sensitivity area based on the location and the sensor parameter. User device 210 may acquire the location of user device 210 based on a GPS device, a cell tower connected to user device 210, triangulation, a wireless access point connected to user device 210, and/or a similar technique. Furthermore, user device 210 may acquire information on the sensor parameter from a memory of user device 210 and/or the permission model.

Additionally, or alternatively, offload server 240 may calculate a sensitivity area representing a useable area of the sensor and include information identifying the sensitivity area in the permission model. User device 210 may determine the sensitivity area by obtaining the sensitivity area from the permission model received at block 610 and/or calculating the sensitivity area based on information in the permission model.

Additionally, or alternatively, the sensitivity area may represent a physical area that the sensor in user device 210 is actually sensing. For example, the sensitivity area may be based on the location of user device 210 and sensor input information. The sensor input information may indicate data sensed by one or more sensors in user device 210. The sensitivity area may also be based on sensor parameter information in addition to the location of user device 210 and sensor input information. In some implementations, the sensor input information may include any information sensed by the sensor (e.g., a title angle, a focus distance, a direction, a humidity, a pressure, an acceleration, etc.). For example, assume the sensor is a camera capable of acquiring an image of an object no more than 500 meters away and has a view angle of 180°. Further, assume user device 210 has GPS coordinates corresponding to location A. Additionally, assume a gyroscope and/or gyrocompass in user device 210 indicate user device 210 is facing north. The sensitivity area may be calculated to be a half sphere facing north with a radius of 500 meters from location A. The half sphere facing south at location A may not be included in the sensitivity area because user device 210 is not facing that direction, even though user device 210 is capable of sensing the half sphere facing south if user device 210 were to change directions. Thus, the sensitivity area may be narrowed when sensor input information (e.g., a direction user device 210 is facing) is used to detect an area the sensor is actually sensing.

In some implementations, user device 210 may determine the sensitivity area representing a physical area that the sensor in user device 210 is actually sensing by calculating the sensitivity area based on the location, the sensor parameter, and the sensor input information. User device 210 may acquire the location of user device 210 based on a GPS device, a cell tower connected to user device 210, triangulation, a wireless access point connected to user device 210, and/or a similar technique. Furthermore, user device 210 may acquire information on the sensor parameter from a memory of user device 210 and/or the permission model. User device 210 may generate the sensor input information based on data obtained from the sensor.

Additionally, or alternatively, offload server 240 may calculate a sensitivity area representing a physical area that the sensor in user device 210 is actually sensing representing a useable area of the sensor and include information identifying the sensitivity area in the permission model. User device 210 may determine the sensitivity area by obtaining the sensitivity area from the permission model received at block 610 and/or calculating the sensitivity area based on information in the permission model. For example, the permission model may include information identifying a sensitivity area representing a physical area that the sensor is capable of sensing based on the location and the sensor parameter. User device 210 may obtain this information from the permission model and calculate the sensitivity area representing a physical area that the sensor in user device 210 is actually sensing based on the sensor input information generated by user device 210 and the permission model. In other words, user device 210 may use the sensor input information to narrow the sensitivity area calculated by offload server 240 and received by user device 210 in the permission model.

As shown in FIG. 6, process 600 may further include identifying a restricted area in the sensitivity area based on the permission model (block 640). For example, user device 210 may identify a restricted area identified by the permission model based on the determined sensitivity area. For example, user device 210 may search the permission model to determine if the determined sensitivity area includes a restricted area defined by a restricted area boundary. For example, assume the sensitivity area is a sphere with a radius of 500 meters centered at location A. Also, assume a school grounds, located 100 meters from location A, is designated as a restricted area in the permission model. Thus, user device 210 may identify the school grounds as a restricted area in the sensitivity area.

By narrowing the sensitivity area from a physical area that the sensor is capable of sensing to a physical area that the sensor is actually sensing as previously discussed, more accurate restricted areas may be identified. For example, the sensitivity area included in the permission model may represent a physical area that the sensor in user device 210 is capable of sensing, but not necessarily an area that the sensor is actually sensing. Furthermore, the area the sensor is actually sensing may not include the restricted area. Therefore, user device 210 may determine locally whether the restricted area is in the sensitivity area based on the area that the sensor is actually sensing and the restriction area information included in the permission model (e.g., a boundary of the restricted area). For example, assume a user takes user device 210 to a concert where a stage has been designated as a restricted area that prohibits camera use. Further, assume the user is standing 50 meters from the stage and is using a camera, of user device 210, to take a picture of a friend standing 20 meters in front of the stage. Also, assume the camera has a range of 500 meters resulting in a sphere shaped sensitivity area with a radius of 500 meters and centered at the location of user device 210. Thus, the sensitivity area includes the stage 50 meters away. However, based on a focal length of the camera indicating the camera is focused 20 meters away and the restriction area information representing the boundary of the stage, user device 210 may determine that the camera is not taking an image of the stage (i.e., the camera is focused outside the restricted area). Accordingly, user device 210 may determine that the stage is not in the sensitivity area.

As shown in FIG. 6, process 600 may further include identifying a restriction that is associated with the restricted area (block 650). For example, user device 210 may identify a restriction associated with the restricted area identified at block 640 using the permission model. For example, assume a restriction "video recording prohibited from 8 am-4 pm" is associated with the school grounds in the permission model. Thus, user device 210 may identify "video recording prohibited from 8 am-4 pm" as the restriction associated with the school grounds (i.e., the restricted area).

As shown in FIG. 6, process 600 may further include generating a response to the request based on the identified restriction (block 660). For example, user device 210 may generate the response to the request. Additionally, or alternatively, user device 210 may acquire the response form the permission model. The response to the request may take several forms. In some implementations, the response may be a token, a cryptographic token, a permission token, a flag, etc.

In some implementations, the response may include permission information indicating whether the sensor is permitted to use the sensor. For example, the permission information may be a 0 or a 1 indicating whether the sensor is permitted to use the sensor based on the restriction identified in block 650. In other words, user device 210 may determine whether the sensor is permitted to be used. For example, assume user device 210 identifies the restriction "video recording prohibited from 8 am-4 pm" and it is 9 am at a location of user device 210. User device 210 may determine the sensor is prohibited from video recording and generate a response indicating the sensor (e.g., a camera) cannot be used.

In some implementations, the response may include expiration information indicating an expiration of the response. For example, the expiration information may indicate the response can only be used a certain number of times and/or expires after a certain amount of time.

In some implementations, the response may restrict or prohibit use of a sensor if there is conflicting location information and/or sensor input information. For example, if a location determined by GPS conflicts with a location determined using a cell tower, permission to use the sensor may not be granted.

As shown in FIG. 6, the process 600 may further include providing the response (block 670). For example, user device 210 may provide the response by transmitting or sending the response to the sensor and/or the application that requested use of the sensor.

While a series of blocks has been described with regard to FIG. 6, the blocks and/or the order of the blocks may be modified in some implementations. Additionally, or alternatively, non-dependent blocks may be performed in parallel. For example, the request to use the sensor (block 620) may come after the restriction has been identified (block 650). In this way, the response to the request may be generated more quickly and there will be less delay between the request to use the sensor and the response than if the restriction is identified after the request is received. In other words, blocks 610, 630, 640, and 650 may be continuously or periodically performed in the background of user device 210 so that restrictions for sensors are identified before the sensors are requested for use.

Figure 7A:
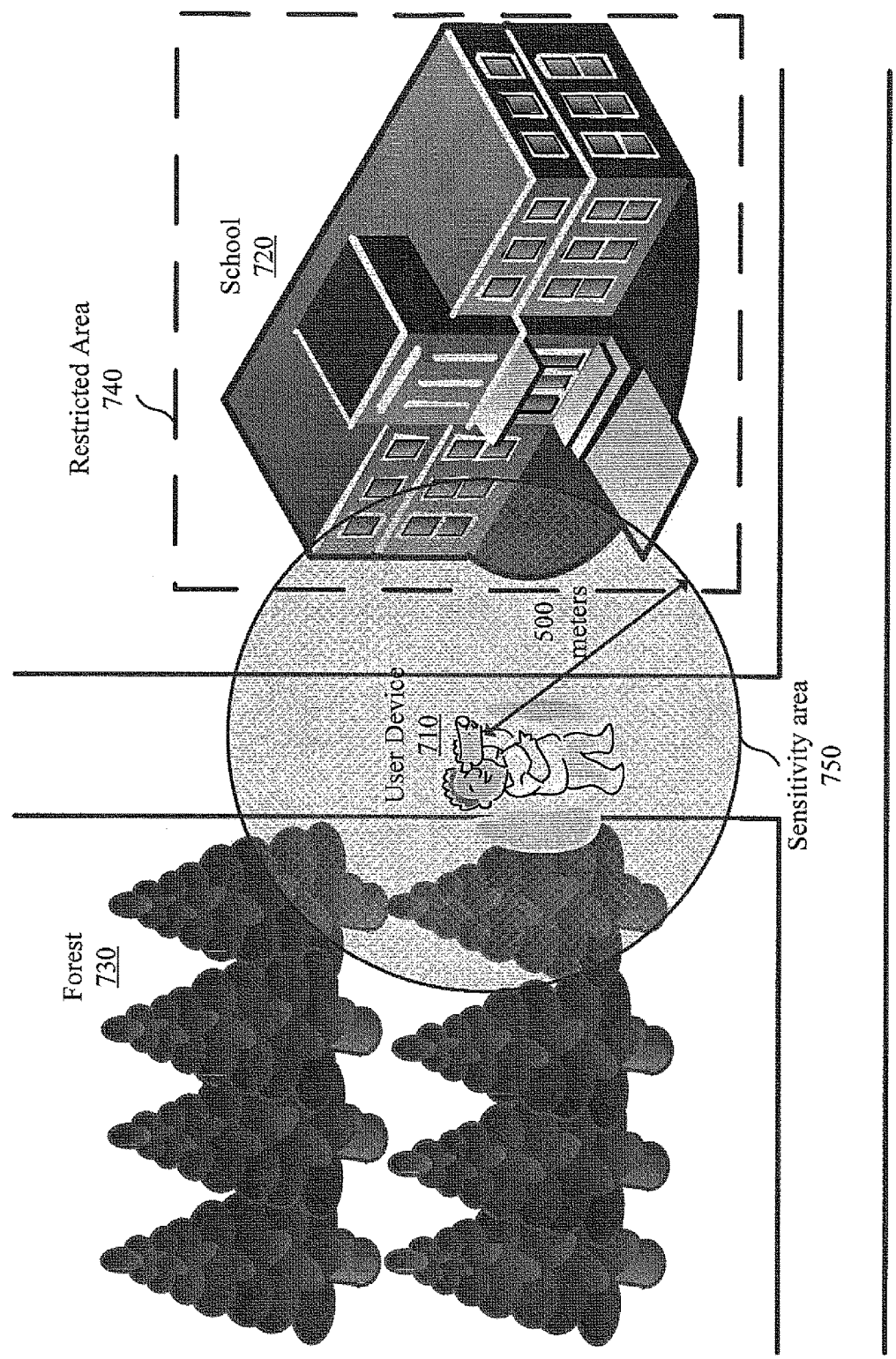

FIGS. 7A-7C are diagrams of an example implementation relating to process 600 shown in FIG. 6.

FIG. 7A illustrates an example implementation 700A where a user device 710 is located between a school 720 and a forest 730. Assume school 720 has been designated a restricted area 740 that is identified in a blocked location storage device, and forest 730 has not been designated a restricted area. As can be seen in FIG. 7A, a boundary of restricted area 740 is illustrated with a dashed line. Further, assume the blocked location storage device associates a restriction of prohibiting all recording of restricted area 740 (regardless of whether the recording occurs within or external to restricted area 740).

Assume a user of user device 710 is attempting to use a camera included in user device 710 to record an image. User device 710 transmits information identifying a location of user device 710 and information identifying user device 710 to a server. Based on the information identifying user device 710, the server determines a camera parameter indicating the camera can record images of objects up to a maximum of 500 meters away. Based on the location and the camera parameter, the server determines a sensitivity area 750. Sensitivity area 750 is centered at the location of user device 710 and extends 500 meters in every direction. As can be seen in FIG. 7A, sensitivity area 750 overlaps both restricted area 740 and forest 730.

The server searches the blocked location storage device for any restricted areas in sensitivity area 750 and identifies restricted area 740 as being in sensitivity area 750. Further, the server identifies the restriction associated with restricted area 740 (i.e., all recording is prohibited). The server generates a permission model and provides the permission model to the user device 710. Assume the permission model includes restriction information indicating that all recording of restricted area 740 is prohibited, restriction area information indicating a boundary of restricted area 740, and sensitivity area information indicating a sensitivity area the camera is capable of sensing.

FIG. 7B illustrates an example implementation 700B where user device 710 is not permitted to record an image of school 720. Assume a camera application requests to use the camera to record an image. Further, assume the user is pointing user device 710 at restricted area 740 to take the image. User device 710 determines, based on a gyroscope included within user device 710, that user device 710 is facing east. Based on the location of user device 710, the direction user device 710 is facing, the sensitivity area information in the permission model, and the restriction area information in the permission model, user device 710 determines that the camera is focused on restricted area 740. Accordingly, user device 710 may obtain the restriction associated with restricted area 740 based in the restriction information in the permission model. Thus, user device 710 determines the camera is prohibited from recording an image. Accordingly, user device 710 may provide a response to the application that recording is not permitted and display an image indicating that recording is not permitted as illustrated in FIG. 7B.

In this way, even though user device 710 is not actually within restricted area 740 itself, recording of restricted area 740 may still be prohibited and the privacy of the school and the school's occupants can be protected.

FIG. 7C illustrates an example implementation 700C where user device 710 is permitted to record an image of forest 730. Assume the user is pointing user device 710 at forest 730 to take an image. User device 710, determines based on the gyroscope included within user device 710, that user device 710 is facing west. Based on the location of user device 710, the direction user device 710 is facing, and the restriction area information in the response, user device 710 determines the camera is not focused on restricted area 740. Thus, user device 710 determines the camera is permitted to record an image. Accordingly, user device 710 may record an image and display the recorded image, as illustrated in FIG. 7C.

In this way, user device 710 may be prohibited from recording an image of restricted area 740 from its current location, but permitted to record an image of another area (e.g. forest 730) from its current location.

FIGS. 8A and 8B are diagrams of example implementations relating to process 600 shown in FIG. 6.

FIG. 8A illustrates an example implementation 800A where user device 810 is permitted to record audio. Assume user device 810 includes a microphone 820 and is brought into an auditorium 830. Also, assume that a stage in auditorium 830 is designated as a restricted area that prohibits audio recording while a band is on stage. Further, assume that microphone 820 has a large enough range to record sound at the stage.

Before a band goes on stage, assume a user of user device 810 desires to record audio using microphone 820. User device 810 transmits a location of user device 810 and information identifying user device 810 to a server. Based on the information identifying user device 810, the server determines a microphone parameter (e.g., a range of the microphone) of the microphone in user device 810. Based on the location and the microphone parameter, the server determines a sensitivity area in which microphone 820 is capable of sensing sound. Assume the sensitivity area includes the stage.

The server searches a blocked location storage device for any restricted areas in the sensitivity area and identifies the stage as a restricted area in the sensitivity area. Accordingly, the server identifies a restriction associated with the stage in the blocked location storage device. For example, the restriction may be to prohibit audio recording at a certain time (e.g., a scheduled time the band is on stage) and/or to prohibit audio recording when a switch is activated backstage. The server may generate a permission model identifying the restricted area, the restriction, and the sensitivity area. The server may then transmit the permission model to user device 810 and user device 810 may receive the permission model.

Assume that in example implementation 800A, an application requests to use the microphone to record audio at a time the band is not scheduled to be on stage and/or the switch has not been activated backstage. Thus, user device 810 determines the restriction at the stage does not apply and generates a response to the request based on the restriction not applying. For example, the response may include permission information indicating that audio recording is permitted. As shown in FIG. 8A, user device 810 allows audio recording using microphone 820 based on the permission information in the response.

FIG. 8B illustrates an example implementation 800B where user device 810 is prohibited from recording audio. Assume the band is on stage in auditorium 830 and the user of user device 830 desires to record audio using microphone 820. User device 810 transmits the location of user device 810 and the microphone parameter (e.g., the range of the microphone) to the server. Based on the location and the microphone parameter, the server determines a sensitivity area in which microphone 820 is capable of sensing sound. Assume that the sensitivity area includes the stage.

The server searches the blocked location storage device for any restricted areas in the sensitivity area and identifies the stage as a restricted area in the sensitivity area. Additionally, or alternatively, the band may have a tracking device (e.g., in a guitar) that updates the band's position and updates a boundary of a restricted area around the band in the blocked location storage device. Thus, the server may identify the area around the band as a restricted area in the sensitivity area.

The server identifies a restriction associated with the identified restriction area. For example, the restriction may be to prohibit audio recording at a certain time (e.g., a scheduled time the band is on stage), to prohibit audio recording of the stage when a switch is activated backstage, and/or to prohibit audio recording of the area around the band. The server may generate a permission model identifying the restricted area, the restriction, and the sensitivity area. For example, the permission model may indicate that the switch is activated backstage and/or the location of the tracking device. The server may then transmit the permission model to user device 810 and user device 810 may receive the permission model.

User device 810 determines that the restriction of prohibiting audio recording applies to the microphone based on the current time, the switch being activated backstage, and/or the tracking device being located in the sensitivity area. User device 810 may generate a response to the request based on the restriction. For example, the response may include permission information indicating that audio recording is prohibited. User device 810 may transmit the response to the application that requested to use the microphone. Accordingly, as shown in FIG. 8B, user device 810 prohibits audio recording using microphone 820 based on the permission information in the response.

Implementations described herein may protect privacy of restricted areas by placing restrictions on what a user device can record or sense within a usable range of the sensor regardless of whether the user device is located within the restricted areas.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A mobile communication device, comprising:
    one or more processors to:
        receive a permission model for a sensor of the mobile communication device,
            the permission model including information indicating that:
                a restriction applies to a first set of mobile communication devices associated with a first set of users,
                the first set of users comprising a user of the mobile communication device, and
                the restriction does not apply to a second set of mobile communication devices associated with a second set of users;
        receive a request to use the sensor of the mobile communication device;
        determine a sensitivity area associated with the sensor,
            the sensitivity area indicating an area the sensor is capable of sensing;
        identify a restricted area in the sensitivity area,
            the restricted area corresponding to an area from which the mobile communication device is limited from use;
        identify the restriction based on identifying the restricted area; and
        provide, for display and based on the permission model and the restriction, a representation of the restriction where an object, in the restricted area, would be displayed,
            the representation of the restriction being provided, for display, while recording a representation of the sensitivity area.

2. The mobile communication device of claim 1, where the one or more processors, when determining the sensitivity area associated with the sensor, are to:
    determine the sensitivity area based on a location of the mobile communication device and a sensor parameter of the sensor,
        the sensor parameter indicating a capability of the sensor.

3. The mobile communication device of claim 1, where a sensor parameter indicates a range at which the sensor is capable of sensing information.

4. The mobile communication device of claim 1, where the one or more processors, when determining the sensitivity area associated with the sensor, are to:
    determine the sensitivity area based on a location of the mobile communication device and sensor input information,
        the sensor input information indicating data sensed by at least one of the sensor or another sensor in the mobile communication device.

5. The mobile communication device of claim 4, where the sensor input information indicates at least one of:
    a tilt angle of the mobile communication device,
    a focus distance of a camera in the mobile communication device,
    an acceleration of the mobile communication device,
    a velocity of the mobile communication device,
    a vibration of the mobile communication device,
    a humidity level sensed by the mobile communication device,
    an audio level sensed by the mobile communication device, or
    a direction that the mobile communication device is facing.

6. The mobile communication device of claim 4, where the one or more processors, when determining the sensitivity area associated with the sensor, are further to:
    determine the sensitivity area based on the location of the mobile communication device, the sensor input information, and a sensor parameter of the sensor,
        the sensor parameter indicating a capability of the sensor.

7. The mobile communication device of claim 1, where the permission model includes information identifying the sensitivity area indicating the area that the sensor is capable of sensing;
    where the one or more processors are further to:
        determine an actual sensitivity area the sensor is actually sensing based on the permission model and sensor input information,
            the sensor input information indicating data sensed by at least one of the sensor or another sensor in the mobile communication device; and
    where the one or more processors, when identifying the restricted area, are to:
        identify the restricted area in the actual sensitivity area the sensor is actually sensing.

8. A non-transitory computer-readable medium storing instructions, the instructions comprising:
    a plurality of instructions that, when executed by a processor of a mobile communication device, cause the processor to:
        receive a permission model for a sensor of the mobile communication device,
            the permission model including information indicating that:
                a restriction applies to a first set of mobile communication devices associated with a first set of users, the first set of users comprising a user of the
mobile communication device, and
the restriction does not apply to a second set of
mobile communication devices associated with
a second set of users;
receive a request to use the sensor of the mobile
communication device;
determine a sensitivity area corresponding to the sensor,
the sensitivity area indicating a usable area of the
sensor;
determine a restricted area in the sensitivity area;
determine that the restriction corresponds to the
restricted area; and
provide, for display and based on the permission model
and the restriction, a representation of the restriction
where an object, in the restricted area, would be
displayed,
the representation of the restriction being provided,
for display, while recording a representation of the
sensitivity area.

9. The non-transitory computer-readable medium of claim 8, where the plurality of instructions, when executed by the processor, further cause the processor to:
query a data structure based on information associated with the sensitivity area; and
obtain information identifying the restricted area in the sensitivity area based on the query.

10. The non-transitory computer-readable medium of claim 8, where the plurality of instructions, when executed by the processor, further cause the processor to:
query a data structure based on information associated with the restricted area; and
obtain information identifying the restriction based on the query.

11. The non-transitory computer-readable medium of claim 8, where the restriction prohibits the sensor from capturing data from the restricted area.

12. The non-transitory computer-readable medium of claim 8, where the restriction limits at least one of:
an input component in the mobile communication device from inputting information, or
an output component in the mobile communication device from outputting information.

13. The non-transitory computer-readable medium of claim 8, where the restriction includes a non-location based condition for the restriction to apply.

14. The non-transitory computer-readable medium of claim 13, where the non-location based condition is based on sensor input information indicating data sensed by at least one of the sensor or another sensor in the mobile communication device.

15. The non-transitory computer-readable medium of claim 14, where the sensor input information indicates at least one of:
a tilt angle of the mobile communication device,
a focus distance of a camera in the mobile communication device,
an acceleration of the mobile communication device,
a velocity of the mobile communication device,
a vibration of the mobile communication device,
a humidity level sensed by the mobile communication device,
an audio level sensed by the mobile communication device, or
a direction that the mobile communication device is facing.

16. A method, comprising:
receiving, by a mobile communication device, permission information for a sensor of the mobile communication device,
the permission information including information indicating that:
a restriction applies to a first set of mobile communication devices associated with a first set of users,
the first set of users comprising a user of the mobile communication device, and
the restriction does not apply to a second set of mobile communication devices associated with a second set of users;
receiving, by the mobile communication device, a request to use the sensor of the mobile communication device;
determining, by the mobile communication device, a sensitivity area associated with the sensor,
the sensitivity area indicating an area that the sensor is capable of sensing;
identifying, by the mobile communication device, a restricted area in the sensitivity area;
identifying, by the mobile communication device, the restriction based on identifying the restricted area; and
providing, by the mobile communication device for display and based on the permission information and the restriction, a representation of the restriction where an object, in the restricted area, would be displayed,
the representation of the restriction being provides, for display, while recording a representation of the sensitivity area.

17. The method of claim 16, where the permission information is first permission information;
where the method further comprises:
receiving second permission information identifying a plurality of restricted areas in a predetermined area around a location of the mobile communication device,
the restricted area being one of the plurality of restricted areas, and where identifying the restricted area includes:
identifying the restricted area based on the second permission information.

18. The method of claim 16, where the permission information is first permission information;
where the method further comprises:
receiving second permission information identifying the restriction associated with the restricted area, and
where obtaining the restriction includes:
obtaining the restriction from the second permission information.

19. The method of claim 16, where the permission information is first permission information;
where the method further comprises:
receiving second permission information including information identifying the sensitivity area indicating the area that the sensor is capable of sensing; and
determining an actual sensitivity area the sensor is actually sensing based on the second permission information and sensor input information,
the sensor input information indicating data sensed by at least one of the sensor or another sensor in the mobile communication device; and
where identifying the restricted area includes:
identifying the restricted area in the actual sensitivity area the sensor is actually sensing.

20. The method of claim 16, where the restricted area is an area based on location information transmitted by a transmitting device, the location information indicating a location of the transmitting device.

\* \* \* \* \*